US012689853B2

(12) United States Patent
Lin et al.

(10) Patent No.: US 12,689,853 B2
(45) Date of Patent: Jul. 21, 2026

(54) HEADBAND FOR A HEADSET

(71) Applicant: GN AUDIO A/S, Ballerup (DK)

(72) Inventors: Frank Lin, Ballerup (DK); Felix Carlsson, Ballerup (DK); Mikael Collin, Ballerup (DK); Lars Kristensen, Ballerup (DK); Jon Grane Madsen, Ballerup (DK); Bill Zeng, Ballerup (DK); Zongyi Zhao, Ballerup (DK)

(73) Assignee: GN AUDIO A/S, Ballerup (DK)

( * ) Notice: Subject to any disclaimer, the term of this patent is extended or adjusted under 35 U.S.C. 154(b) by 239 days.

(21) Appl. No.: 18/681,642

(22) PCT Filed: Sep. 28, 2021

(86) PCT No.: PCT/CN2021/121456
§ 371 (c)(1),
(2) Date: Feb. 6, 2024

(87) PCT Pub. No.: WO2023/050090
PCT Pub. Date: Apr. 6, 2023

(65) Prior Publication Data
US 2024/0348966 A1 Oct. 17, 2024

(51) Int. Cl.
*H04R 1/10* (2006.01)

(52) U.S. Cl.
CPC ........... *H04R 1/105* (2013.01); *H04R 1/1008* (2013.01)

(58) Field of Classification Search
CPC .... H04R 1/105; H04R 1/1058; H04R 1/1066; H04R 1/10; H04R 1/1008; H04R 5/0335
See application file for complete search history.

(56) References Cited

U.S. PATENT DOCUMENTS

2015/0272292 A1 10/2015 Taylor
2016/0050486 A1 2/2016 Uggla et al.
2020/0053448 A1 2/2020 Heaston et al.
2021/0029435 A1 1/2021 Siahaan et al.
2021/0037317 A1 2/2021 Wahlin

FOREIGN PATENT DOCUMENTS

CN 209390270 U 9/2019
CN 210298009 U 4/2020

OTHER PUBLICATIONS

International Search Report and Written Opinion issued in PCT/CN2021/121456, dated Jun. 23, 2022, 6 pages provided.
The extended European search report issued in European Application No. 21958685.6, mailed Jun. 23, 2025.

*Primary Examiner* — Tuan D Nguyen
(74) *Attorney, Agent, or Firm* — HSML P.C.

(57) ABSTRACT

A headband for a headset is disclosed. The headband is configured to carry at least one earcup of the headset. The headband comprises a carrier and a foam padding. The carrier is curved to conform to a wearer's head and has a central carrier region. The foam padding is coupled to the carrier and configured to abut the wearer's head when the headband is worn by the wearer. The foam padding has a uniform shape and defines a central foam region arranged at the central carrier region and a peripheral foam region arranged outside of the central carrier region. The foam padding in the central foam region has a lower hardness than the foam padding in the peripheral foam region.

15 Claims, 6 Drawing Sheets

HEADBAND FOR A HEADSET

FIELD

The present disclosure relates to a headband for a headset. The headband comprises a carrier and a foam padding.

BACKGROUND

Headsets may be used in various settings and users may be wearing the headsets during long time spans. Due to many different types of head shapes and head sizes, it is difficult to have uniform pressure distribution on all head types. Normally, the top points of a user's head share more pressure than other areas and therefore the user could feel more pressure at the top points. Additionally, the human head is most pain sensitive in the top point due to connection between skull bones. Therefore, users typically have pain points on the head top after wearing a headset for shorter or longer time spans.

Thus, headset users require a comfortable design, a good fit, as well as good stability of the headset. Also, most of the users desire lightweight headsets and headsets with a sleek design. Therefore, it is desired to have a headset which provides a good overall fit with the user's head and, at the same time good comfort for the user, especially at the top of the head. All these characteristics are mainly determined by a headband typically worn over the user's head. A number of different headbands are available on the market. Most of the available headbands have several pieces which allow users to adapt the headband to their own preferences. Additionally, some headbands available on the market utilize various custom-made pieces or materials that make their manufacturing complex and expensive. Having a headband with many separate pieces can be complex to use, movable parts are prone to wear, the user may not be able to achieve an optimal fit, and assembly of such headbands can be complex and thereby expensive.

There is a need for a headband for a headset to overcome problems of the prior art.

SUMMARY

It is an object of embodiments of the present invention to provide a headband which provides an improved comfort to potential users.

It is a further object of embodiments of the present invention to provide a headband with a larger touch area and a better pressure distribution on a user's head compared to headbands known in the art.

It is yet one object of the embodiments of the present invention to provide a headband which utilizes commercially available materials.

It is an object of embodiments of the present invention to provide a one-piece headband which fits all head sizes.

It is also an object of embodiments of the present invention to provide a headband with a simplified design compared to headbands known in the art.

It is a further object of embodiments of the present invention to provide a headband which is easy to manufacture and assemble.

In a first aspect, the invention discloses a headband for a headset. The headband is configured to carry at least one earcup of the headset. The headband comprises a carrier and a foam padding. The carrier is curved to conform to a wearer's head and has a first carrier end, a second carrier end and a central carrier region between and elevated relative to the first and second carrier ends. The foam padding is coupled to the carrier and configured to abut the wearer's head when the headband is worn by the wearer. The foam padding may be configured to have a uniform shape. The foam padding is defining a central foam region arranged at the central carrier region and a peripheral foam region arranged outside of the central carrier region. The foam padding in the central foam region has a lower hardness than the foam padding in the peripheral foam region.

In the present context, the term "headband" is to be interpreted to refer to a band to be worn over the user's head, and in particular over the top of the user's head while the ends of the headband may abut sides of the user's head, e.g. at the ear(s). In the following, the terms "user" and "wearer" may be used interchangeably about the person having the headset on his/her head.

The headband is suitable for a headset, and in particular for an over-the-head headset. In other words, the headband forms part of a headset. The headset, in addition to the headband, comprises an earcup carried by the headband. The engagement between the headband and the earcup can be established in various ways known in the art. The earcup is typically arranged at one end of the headband. The other end of the headband may comprise a stabilization element abutting a side of the user's head to ensure proper positioning of the headband and headset. The earcup defines an inner surface, typically for engagement against one of the ears of the user. The earcup may comprise various electronic elements necessary for a proper functioning of the headset, and in particular a speaker configured to generate a sound signal. Alternatively, the earcup may be a passive mechanical means configured to provide noise attenuation/cancellation. The headset may further comprise a microphone and/or another earcup to be arranged on the other ear of the user. The microphone may be arranged onto an earcup or, alternatively, directly on the headband. The microphone may be arranged on a microphone boom arm.

The headband of the present invention may be used for an audio headset, i.e. a headset used for audio purposes, and/or it may be used for a noise-attenuating headset which provides a passive noise attenuation capability.

The headband at least comprises a carrier and foam padding. The carrier and foam padding may form one piece. Namely, the carrier and foam padding, may form an integral part and cannot be detached from each other in a non-destructive manner, i.e. without damaging the headband. Alternatively, the foam padding may be detachably arranged at the carrier.

The carrier is curved to conform to a wearer's head. The carrier may be deformed elastically in order to adapt to the user's head and ears. The carrier defines a central opening and has a first end and a second end which may be arranged on the left and right sides of the user's head. The central carrier region is between the two ends and elevated relative to the first and second carrier ends. The central carrier region may hover over the user's head when the headband is worn by the user, and/or it may be configured to abut the top of the user's head when the headband is worn by the user.

In some embodiments, the first carrier end extends into a first side segment towards the central carrier region, and the second carrier end extends into a second side segment towards the central carrier region, forming the carrier. The carrier may be made in one piece. The first side segment and the second side segment are opposite to each other and these opposing segments of the carrier may be substantially parallel. The first and second side segments may be substantially straight and the central carrier region may be curved to thereby define a central opening having a circular cross-sectional geometry. In another embodiment, the first and second side segments may also be curved to thereby define a central opening together with the central carrier region, the opening having a circular cross-sectional geometry. In general, the central carrier region may generally be U-shaped having two ends, i.e. the first carrier end and the second carrier end and may exhibit flexible behaviour to ensure a fit to various head sizes in particular various head widths of potential users. The carrier may be made of a metal material, such as sheet metal, a plastic material, or even wood. The carrier may be machined by a machine, cast in a mold, made by stamping and bending, or even hand made. Regardless of the material selection, the carrier may have a thickness and a width which provide good mechanical stability and flexibility at the same time. Furthermore, the carrier may be configured to provide a basic clamping force exerted to the head of the user. The basic clamping force is manipulated by controlling the thickness and cross section of the carrier. The provided carrier may be produced such that it has a very small variance and deviation from a modelled carrier. The carrier may have a width anywhere between 1 cm and 3 cm.

The first end and the second end may be attached to the at least one earcup, and/or to the microphone, and/or to the stabilization element abutting the side of the user's head to ensure proper positioning of the headband.

The foam padding is typically configured to rest at and abut the top of the user's head when the headband is in use thereby at least partially supporting the weight of the entire headset. The foam padding may be formed from one or more foam types. Any one of commercially available foams such as open and closed cell foams, and in particular such as ADAR, L3015, PORON or similar may be used for the foam padding. The foam material used for the padding may have a density in a range between 10 kg/m$^3$ and 150 kg/m$^3$ and hardness in the range between 5 and 100 ASKER (durometers shore A).

The foam padding may contribute to the basic clamping force generated by the carrier to fine tune it and in particular when the headband is fitted in place on the head. The foam padding provides a secure fit of the headband and further ensures good wearing comfort, especially for long-term wearing comfort thanks to the special distribution of hardness, resulting in a headband which is soft and easy to stress, compress, stretch, and deform at the central region which abut the top of the user's head when the headband is worn by the wearer. By a careful design of the foam material used for the foam padding, wearing comfort can be drastically improved. Normally, soft foams are selected for the padding. Soft foams normally have good processing characteristics as they are widely used for various applications and commercially available. Therefore, manufacturing of the headband is simplified and also less expensive than when specially customized foams are used. As the padding is made of soft foam, when the user stretches the headband to fit it onto the head the padding will adjust automatically to fit the head and to ensure good fit and comfort. The foam material with distributed hardness further allows for paddings of a relatively small thickness, e.g. any value between 5 mm and 20 mm, thus providing a headband which is not bulky and thereby not jeopardizing a headset design, appearance, and/or weight. However, in some embodiments, where bulkiness of the headband is not relevant, the foam padding can be thicker than 15 mm, such as 20 mm, or even 30 mm, or anything between 15 mm and 30 mm. A width of the foam padding may be equal to the width of the carrier.

According to the invention, the headband is formed by coupling the foam padding to the carrier. The foam padding may be disposed along a length of an inner surface of the carrier. The foam padding may be disposed along the entire length of the carrier, i.e. from the first carrier end to the second carrier end, or it may extend over a portion of the side segments and over the central carrier region. The carrier and the foam padding may be permanently joined together to make a single piece. Alternatively, leather, leatherette, fabric, such as woven fabric, silicone rubber, or elastomers like TPU or TPE may be used to contain the foam padding and to connect it to the carrier. The carrier provides a desired rigidity to the headband while the foam padding provides comfort for the user as it is configured to abut the wearer's head when the headband is worn by the wearer.

The foam padding is configured to have a uniform shape. In the present context, the uniform shape is to be interpreted as a continuous shape, i.e. as a continuous surface. The uniform shape, being a uniform surface towards the user's head when the headband is worn. The uniform shape may have a constant and continuous radius measured from a center of the central opening of the headband. In the present context, the uniform shape may be interpreted as a smooth and continuous surface generally following oval shape of human's head. Namely, the foam padding may not have any significant protrusions which would break continuous shape of the padding. The foam padding may have a constant thickness along its entire length. Alternatively, the foam padding may have a thickness that gradually decreases from a midpoint of the central foam region. The midpoint of the central foam region being placed in the middle of the central foam region, typically overlapping the middle point of the carrier placed in the middle between the two carrier ends. The midpoint is normally equidistant from both ends of the U-like shaped carrier. Therefore, the foam padding may be the thickest in the center region abutting the top of the head when the headband is worn by the user. Difference between the foam padding thickness at the top of the headband and at its end points may be around 10-50%.

The foam padding is defining a central foam region arranged at the central carrier region and configured to abut the user's head when the headband is worn by the user. The foam padding in the central foam region is capable of adapting to the shape of the user's head. The foam padding defining the central foam region may extend over the entire length of the central carrier region. Alternatively, the central foam region may be slightly longer or shorter than the central carrier region. The length of the central foam region may be between 3 and 8 cm. The peripheral foam region extends the central foam region and is typically arranged outside of the central carrier region, i.e. at the side segments of the carrier. End points of the peripheral foam region may coincide with the end points of the carrier. The end points of the peripheral foam region may be formed at a distance equally spaced from the midpoint of the carrier. The end points of the peripheral foam region may be arranged at 5-15 cm, such as 5-10 cm distance from the carrier midpoint. The end points of the peripheral foam region may be defined by user's requirements and by a specific purpose of the headband. By arranging the end points of the peripheral foam region symmetrically around the midpoint of the carrier, stability of the headband arranged onto the head of the user can be improved.

According to the present invention, the foam padding in the central foam region has a lower hardness than the foam padding in the peripheral foam region. In other words, the foam padding in the central foam region is softer than in the rest of the foam padding. The softer foam padding is prone to larger deformation and compression and thereby helps in eliminating pain points which typically occur in the top of the user's head. Compression of the softer padding in the central region is partly controlled by the harder padding region to achieve optimal padding deformation and thereby result in optimal comfort for the user. A difference in hardness of the foam padding can be achieved in a number of different ways which will be described in details further below.

In one embodiment, different hardness of the foam padding can be achieved by using at least two different foam types with different hardness for the foam padding. In another embodiment, different hardness of the foam padding can be achieved by taking out small parts of the foam padding to thereby lower the density of the foam in the central region, which will in turn result in a softer padding in the central region abutting the users head. In yet another embodiment, additives may be added to the foam forming the foam padding to thereby achieve different hardness in the peripheral padding region. Additives may be added to gradually change the hardness of the foam such that the resulting foam padding is the softest in the middle of the headband and gradually becomes harder towards the peripheral region and towards end points of the carrier. It is also possible to combine these embodiments. Namely, it is possible to utilize softer foam with cut outs to provide optimal softness in the central region abutting the user's head.

In one embodiment, the central region may have a first foam hardness and the peripheral foam region may have a second foam hardness, wherein the first foam hardness being lower than the second foam hardness.

The foam padding in the central foam region having lower hardness than the padding outside of this central region is softer and therefore has an improved foam deformation resulting in a larger touch area compared to a solution where the padding has a constant hardness. Improved deformation of the padding also ensures that the padding better accommodates a head curve. The larger the touch area is, the better the pressure distribution is and the better distribution of a load on the user's head is. If the foam padding is formed from a foam of a uniform hardness, the headband will cause pain points on the head top no matter how soft the foam is due to largest deformation of foam in the top point. Also, too soft foams may compress too much so that the head is touching the carrier what can create even bigger discomfort.

It is a further advantage of the present invention to have the padding formed from a foam being softer in the middle of the headband, i.e. in the area configured to abut the top of the user's head when the headband is worn, as it would provide improved comfort for the user and eliminate any pain points which normally occur in the top of the head with headbands known in the art.

To change the hardness of the foam padding in the central foam region or in the peripheral foam region, various additives like foaming agents, or other fillers may be injected into the foam padding.

The headband according to the present invention is easy to manufacture as it utilizes commercially available foam which are arranged on the carrier. Such a simple manufacturing saves manufacturing time and expenses as there is no need for further assembling steps in a product line. By careful design and choice of the carrier, the present invention provides a lightweight headband with a soft padding which thereby provides a great comfort to potential users. Simultaneously, a sleek design, normally desired by a majority of users, can be achieved. Additionally, the headband according to the present invention provides a uniform clamping force uniformly distributed over the user's ears and the top of the head achieved by the carrier. The headband is therefore easy to use as the user does not have to adjust the tightness of the headband all the time. Finally, having the foam pad as a part of the headband provides a headband in which a pressure to the user's head is uniformly distributed along the contact between the user's head and the headband, and in particular in which there are no prominent pain points around the top of the head.

In some embodiments, the foam padding hardness changes gradually from the midpoint of the central foam region towards the peripheral foam region. The gradual change is typically a gradual increase of the hardness. It is an advantage of the present invention to have the foam padding which is softest in the midpoint which would typically abut the user's head and to then have a gradual transition to a harder foam padding as the harder foam padding would not allow the soft padding to completely compress so that the user can feel the carrier which is normally hard.

In some embodiments, the foam padding comprises a first foam arranged in the central foam region and a second foam arranged in the peripheral foam region. The first foam may be softer than the second foam. The first foam may have lower hardness than the second foam. The hardness of foam is a measurement that gives a perceived firmness rating for the wearer, i.e. the harder the foam is the firmer it will feel. The first foam may have a lower density than the second foam. The first foam may be glued to the second foam. Alternatively, the first foam and the second foam may be attached to the carrier separately and form a uniform foam padding. The first foam and the second foam may have the same thickness. Alternatively, the first foam may be thickest at the midpoint and may gradually be thinner towards the second foam to match the thickness of the second foam. The first foam may be configured to rest on the wearer's head when the headband/headset is worn in its intended position on the user's head. Such a headband can provide a soft padding of only 2-10 mm thickness thereby providing a comfortable, lightweight headband looking slim and neat. Such design provides a number of improvements compared to traditional bulky design normally resulting in a heavy headband. Additionally, such shape improves flexibility and deformability of the padding. Furthermore, the uniform shape improves wearing comfort as no sharp edges may cause discomfort. Also, the continuous uniform shape ensures that the pressure of the headband exerted to the wearer's head is uniformly distributed over the surface of the padding.

In some embodiments, a transition in the foam padding in the peripheral foam region to the foam padding in the central foam region is angled. Namely, the central padding region may have a sloped change in hardness when transitioning to the peripheral foam region. Angled transition in hardness can be understood as a gradual change in hardness. It is beneficial to have angled transition between the central foam region and the peripheral foam region as it provides a better distribution of the load on the head top without any prominent pressure points. Namely, pressure distribution is equalized in the central foam region and also at the transition to the peripheral foam region. Alternatively, the change in the hardness may be abrupt. For instance, the central foam region may comprise foam of the first hardness and foam may have a substantially rectangular shape. The peripheral regions may then abut the central foam region.

In some embodiments, the cross-section of the central foam region perpendicular to the length of the headband has a substantially trapezoid-like shape. In some embodiments, the central foam region may have a substantially annulus cross-section. In some embodiments the central foam region may be a curved trapezoid in the cross-section. The trapezoidal cross-section provides a smooth transition in hardness from the top of the headband and results in improved wearing comfort due to equalized pressure distribution along the foam padding, and in particular along the central foam region. In some embodiments, the cross-section of the central foam region perpendicular to the length of the headband has a substantially triangular shape. An angle of the trapezoid or triangle may be below 90° and above 15°, such as 75°, such as 65°, such as 60°, such as 50°, such as 45°, such as 30°.

In some embodiments, the length of the central foam region closer to the carrier is shorter than the length of the central foam region abutting the wearer's head when the headband is worn by the wearer. In other words, the foam padding has a tapered hardness profile. Such formation may result in a trapezoid-like or annulus like cross-section of the central foam region. The length of the central foam region abutting the wearer's head may be between 30 and 80 mm and the length of the central foam region closer to the carrier may be between 0 and 40 mm. Such formation of the soft foam allows the central padding portion to bend inwardly and towards the user's head resulting in an improved pressure distribution along the top of the head.

In some embodiments, the foam padding in the central foam region comprises at least one hole formed in the foam padding. In the present context, a hole formed in the foam padding is to be understood as absence of a portion of material forming the foam padding. A hole can be created by removing a portion of the foam padding material. By removing the portion of the foam padding material, the density of the padding is changed thereby resulting in decreased hardness of the central region. Lower hardness results in an improved pressure distribution at the touch area of the head compared to a number of other headbands in the art having a uniform hardness along the headband.

In some embodiments, the at least one hole formed in the foam padding is a through-going hole. Namely, the hole may be created by removing a portion of the padding material to create an opening in the padding material. In other words, the hole is extending all the way through the foam padding. The through-going hole may be formed perpendicularly to the carrier, or in parallel to the carrier, or diagonally through the padding material. In embodiments with a plurality of holes, the holes may be formed by combining any of the three mentioned formations.

In some embodiments, the at least one hole formed in the foam padding is a cut-out of the foam padding. The cut-outs may appear like air bubbles in the padding material. the cut-outs and through-going holes may be combined together to thereby change the density and thus hardness of the foam padding in the central foam region.

In some embodiments, the foam padding in the central foam region comprises a plurality of holes formed in the foam padding and wherein the plurality of holes are arranged such that a number of holes gradually decreases from a midpoint of the central foam region towards the peripheral foam region. Alternatively, density of holes can be changed from the midpoint of the headband towards the peripheral foam region resulting in gradual increase in density and thus hardness of the padding. In yet one alternative, a size of holes can be changed, namely, the holes may get smaller and smaller starting from the midpoint of the headband towards the peripheral foam region.

In some embodiments, a cross-section of the central foam region perpendicular to the length of the headband comprises the plurality of holes arranged in a substantially rhomboid-like arrangement. One diagonal of the rhomboid may coincide a midline of the headband crossing the midpoint of the headband. This diagonal may comprise the largest hole area. Such formation results in the foam padding which is the softest in along the midline and whose softness increases gradually.

In some embodiments, at least two holes have different sizes. At least two holes may have different cross-sections. At least two holes may have different shapes. The plurality of holes may be arranged in a random order, or may be organized to follow a predetermined pattern. The overall goal when arranging the holes is to modify density of the foam to thereby result in a gradual hardness increase starting from the midline of the foam padding towards the peripheral foam padding region.

In some embodiments, the headband for a headset may further comprise an electrical cable attached to the carrier, the electrical cable being configured for electrically connecting the at least one earcup of the headset. The cable may electrically couple a left and right earcups, or the at least one earcup and an earphone unit, and extending through an interior volume defined by the carrier and the foam. The headset may comprise a microphone. The microphone may be arranged on the same side of the headband as the earcup. Otherwise it can be arranged on the other end of the headband and possibly together with another earcup. The electrical cable may also electrically connect two earcups arranged on two ends of the headband, thereby forming a stereo headset. The cable may be attached to the carrier prior to the arrangement of the foam padding. The electrical cable may be attached to the carrier by gluing. Alternatively a pin or similar may be used for attaching the cable to the carrier. When the foam padding is arranged, the electrical cable may be encapsulated between the carrier and the foam padding. Typically, the foam padding will completely encapsulate the cable such that it is not visible on the final headband. The cable may be arranged either on an inner side of the carrier, facing the head of the user, or it can be arranged on an outer side of the carrier, further away of the user's hear, when the headband is worn by the user.

In some embodiments, the carrier and the foam padding may contribute to a clamping force of the headband. The clamping force relates to a level of tightness of the headband. The clamping force also relates to the amount of pressure exerted by the headband against the user's head. The clamping force ensures a good overall fit and engagement of the headband and also a tight fit of the corresponding headset. The carrier may provide a main clamping force while the foam padding contributes by fine tuning the main clamping force. The basic clamping force can be uniformly distributed along the carrier. The clamping force may also be uniformly distributed along the headband. The headband according to the present invention may fit all head sizes of adult users mainly due to the uniformly distributed clamping force. It is however possible to adjust the ratchet length of the carrier and thereby change the length of the carrier. By adjusting the ratchet length different opening distances of the headband can be achieved and thereby different clamping forces. The longer flexible lengths would fit wider heads thereby achieving the appropriate clamping force level. In some embodiments, it is desired that only the carrier contributes to the clamping force. In solutions known in the art, a number of separate parts all contribute to the clamping force of a headband resulting in a non-uniform clamping force. It is therefore advantageous that only two parts, the carrier and foam padding, contribute to the clamping force.

In some embodiments, the carrier is formed from a rigid material. The rigid material may be formed into a U-shape. The rigid material may be metal, hard plastics, carbon fiber, wood, or similar. Additionally, the carrier may be made from any combination of those rigid materials. The carrier may be made from a rigid but still flexible material. In particular metal carrier provides a headband which can stretch to fit different width of human head sizes. The headband can mainly stretch in an x-direction, i.e. parallel with a line connecting the user's ears, e.g. an ear-to-ear (E2E) direction through the head. The soft foam padding can automatically fit a human head and can be deformed vertically to thereby provide good wearing comfort and secure fit.

The carrier may be a metal carrier. Any metal can be used as a carrier, such as aluminium, copper, iron, tin, gold, lead, silver, titanium, zinc, etc. Additionally, metal alloys, such as steel, can also be used. The carrier may be a cold rolled stainless steel strip. The metal carrier may be formed in a bended shape, such as U-like shaped. The metal U-shaped carrier may be flexible. Having a metal carrier provides sufficient rigidity and robustness to the headband, and since the metal machining is well established, the carrier can be properly designed and shaped to exhibit a desired clamping force.

The carrier may also be cast from any hard plastics which can be bended and which can be flexible. The plastics carrier may be formed by injection molding. Thermoplastics which are softened by heat and can be moulded may be used. Thermoplastic carrier may be shaped by injection moulding, blow moulding, or vacuum formation. Examples of thermoplastics are acrylic, polypropylene, polystyrene, polythene and PVC. The carrier may further be made of thermosets, such as melamine, Bakelite, polyester, and epoxy resins which are formed by heat process.

The carrier may also be made of composites made by mixing materials together to get enhanced properties. Polyester resin may be mixed with glass fibre, epoxy resin may be mixed with carbon fibre to achieve a carrier which is stronger than steel but lighter.

The carrier may further be made of acrylic, PVC and uPVC, polythene, high-density polyethylene (HDPE) and a low-density grade polyethylene (LDPE) which is tough and flexible.

The carrier may be provided in a form of a bended strip. The carrier may have a thickness in the range between 0.5 mm and 5 mm. The carrier may have a width in the range between 1 cm and 5 cm. The carrier may have a total length in the range between 10 cm and 30 cm. The carrier may have a yield strength in the range between 500 Mpa and 1000 Mpa. The carrier may have a tensile strength in the range between 1000 Mpa and 1500 Mpa.

In a preferred embodiment, the carrier is made of a hard plastic material and the foam padding is made of L3015 foam forming the central foam region and ADAR foam forming peripheral foam regions. In some embodiments, the carrier may be made of a plastic, such as LDPE, or Polypropylene (PP). In some embodiments, the carrier may be made of stainless steel arranged on top of PP. The foam padding may be made of ADAR foam with a plurality of holes in the central foam region.

In a second aspect, disclosed is a headphone comprising a headband as described above.

In a third aspect, disclosed is a headset comprising a headband as described above in connection with the first aspect of the present invention.

It should be understood that all the embodiments, benefits and advantages described in connection with the first aspect are equally relevant for the second and third aspect.

The present invention relates to different aspects including a headband, as well as a headphone, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
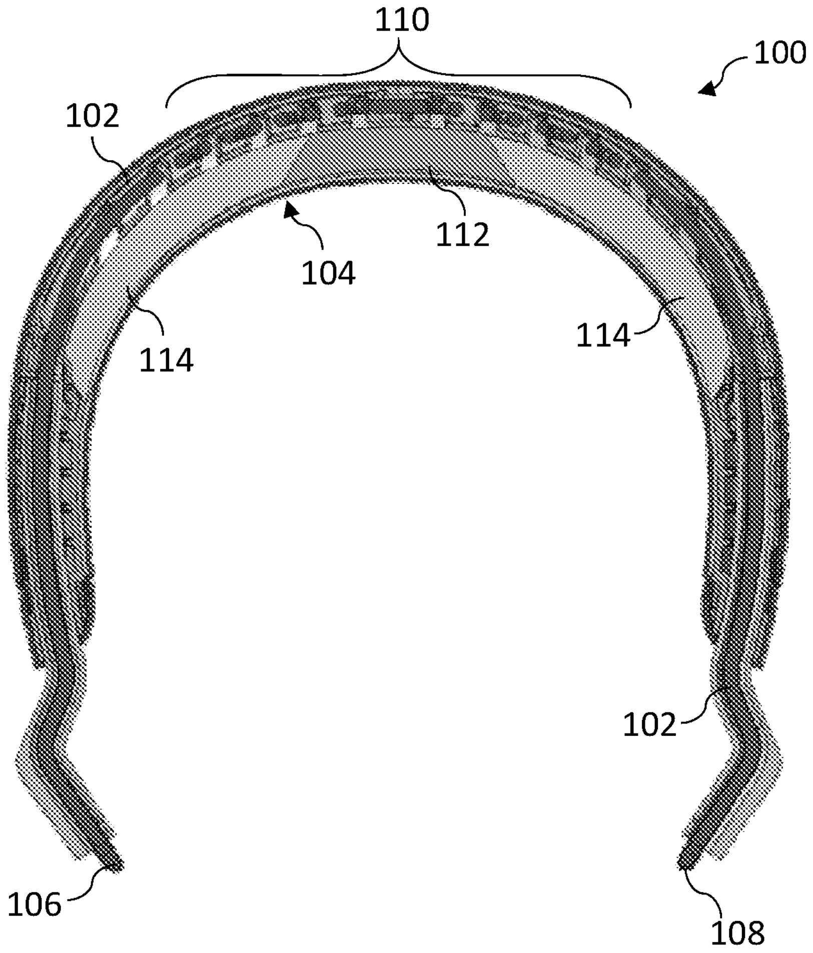
FIG. 1 illustrates a cross section of an exemplary embodiment of a headband for a headset according to one embodiment of the present invention, FIG. 2 compares prior art with embodiments of the present invention, FIG. 3 schematically illustrates an exemplary embodiment of a headband for a headset according to the present invention, FIG. 4 schematically illustrates an exemplary embodiment of the foam padding for the headband according to the present invention, FIG. 5 schematically illustrates yet one exemplary embodiment of the foam padding for the headband according to the present invention, FIG. 6 schematically illustrates yet one exemplary embodiment of the foam padding for the headband according to the present invention, and FIG. 7 schematically illustrates a headphone according to a second aspect of the present invention.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1 illustrates a cross section of an exemplary embodiment of a headband 100 for a headset according to one embodiment of the present invention. The headband 100 is configured to carry at least one earcup of the headset. The headband 100 comprises a carrier 102 and a foam padding 104. The carrier 102 is curved to conform to a wearer's head. The carrier 102 has a first carrier end 106 and a second carrier end 108. The carrier 102 defines a central carrier region 110 between and elevated relative to the first carrier end 106 and the second carrier end 108. The foam padding 104 is coupled to the carrier 102 and configured to abut the wearer's head when the headband 100 is worn by the wearer. The foam padding 104 is configured to have a uniform shape. The foam padding 104 is defining a central foam region 112 arranged at the central carrier region 110. The foam padding is further defining a peripheral foam region 114 arranged outside of the central carrier region 110. The foam padding 104 in the central foam region 110 has a lower hardness than the foam padding 104 in the peripheral foam region 114.

Figure 2:
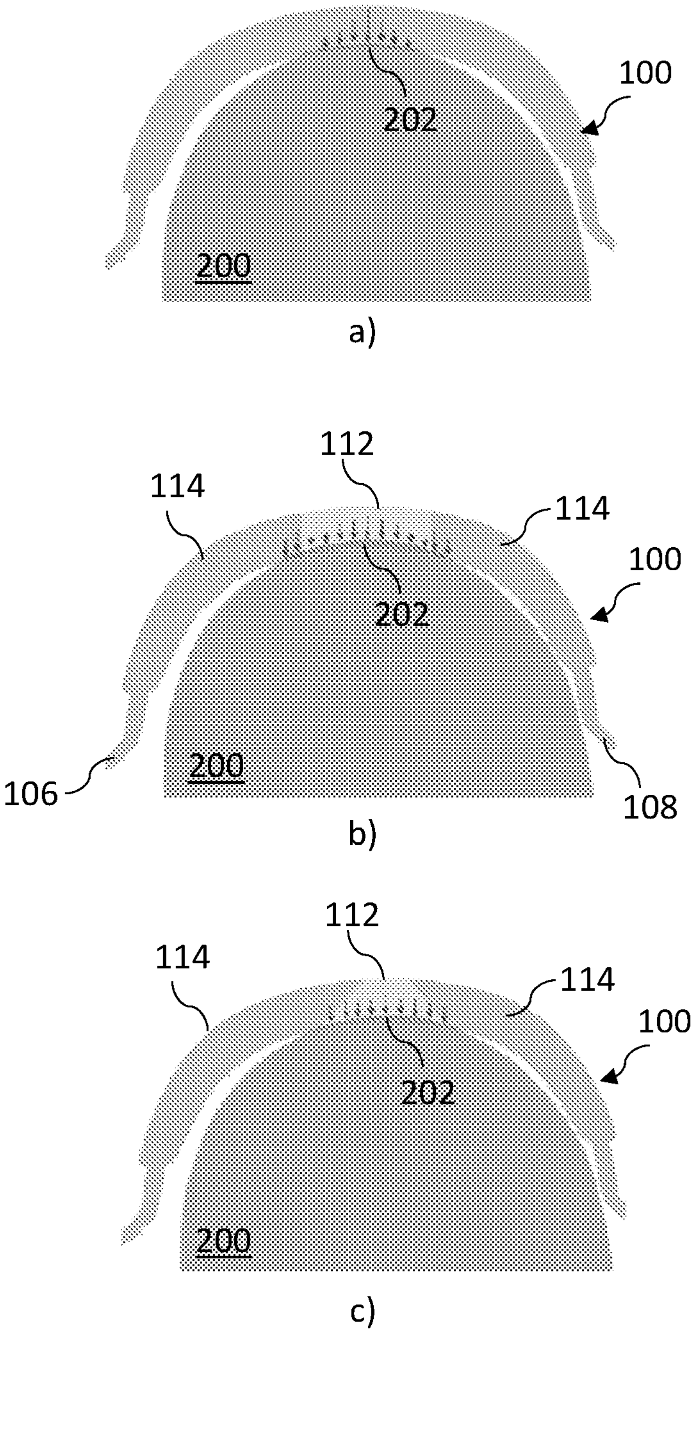

FIG. 2 compares prior art with embodiments of the present invention. FIG. 2*a*) illustrates a headband 100 according to prior art. The headband 100 is arranged on a user's head 200. The headband 100 comprises a padding of a uniform hardness along the entire length of the headband 100. Such uniform hardness results in the highest pressure at the top of the head 200, as it is indicated by arrows 202. Namely, as arrows of pressure distribution 202 are showing, the top of the head 200 suffers the highest pressure and therefore there will be a pain point arising after some time wearing the headband. FIG. 2*b*) illustrates one embodiment of the present invention in which the headband 100 comprises the foam padding in the central foam region 112 having a first hardness and the foam padding in the peripheral foam regions 114 having a second hardness, the second hardness being higher than the first hardness. It can be seen from the pressure distribution 202 that the touch area is increased and that the pressure on the head top is more evenly distributed. Such equalized pressure distribution results in improved comfort for the user and absence of prominent pain points. FIG. 2*c*) illustrates yet one embodiment of the present invention in which the headband 100 also comprises the foam padding in the central foam region 112 having a first hardness and the foam padding in the peripheral foam regions 114 having a second hardness, the second hardness being higher than the first hardness and wherein the hardness profile has a trapezoidal shape. Namely, the sides of the region with the first hardness are angled inwardly. It can be seen from the pressure distribution 202 that the pressure on the head top is more evenly distributed and exhibits absence of any pain points resulting from increased pressure on the head top.

Figure 3:
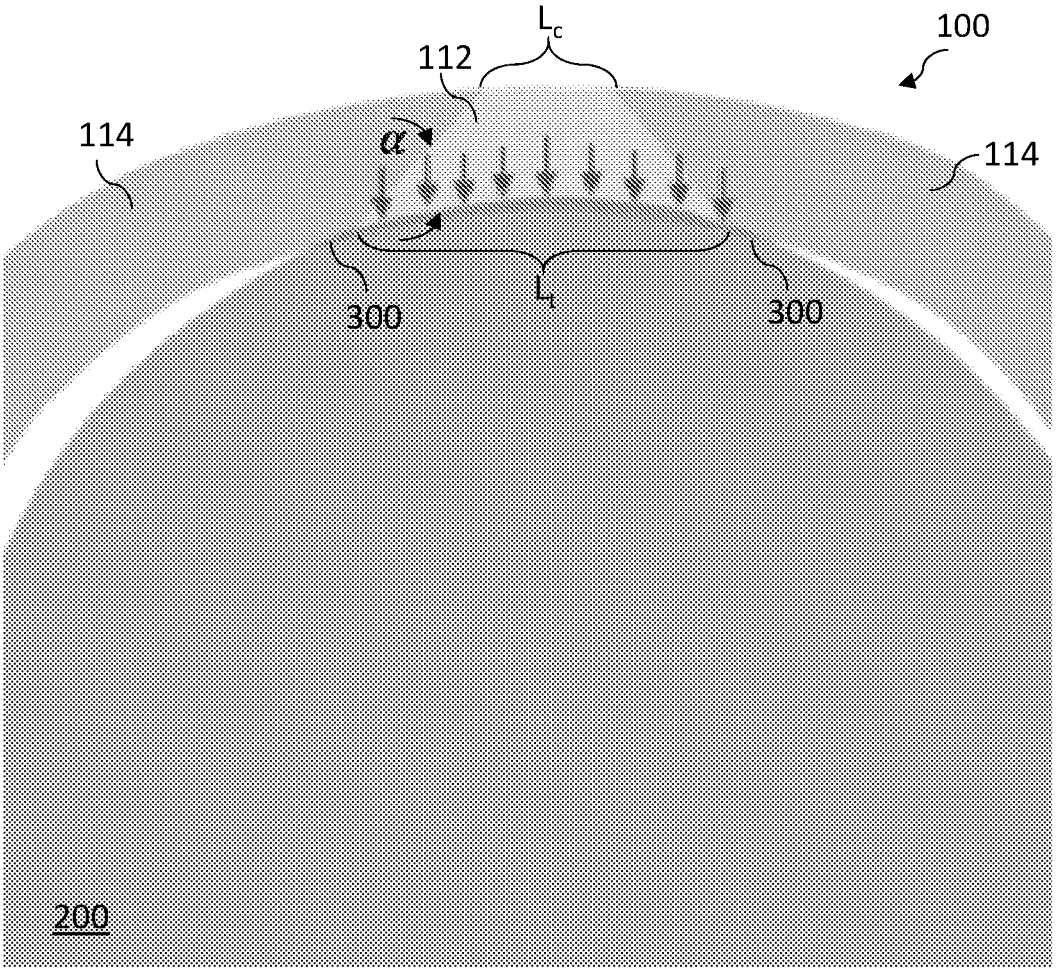

FIG. 3 schematically illustrates an exemplary embodiment of a headband 100 for a headset according to the present invention arranged on a user's head 200. The cross-section of the central foam region 112 perpendicular to the length of the headband 100 is of a curved trapezoid shape. The central foam region 112 has a first hardness and the peripheral foam regions 114 have a second hardness larger than the first hardness. The curved trapezoid, or more precisely its sides, provides a smooth transition in hardness from the top of the headband and results in improved wearing comfort due to equalized pressure distribution along the foam padding, and in particular along the central foam region 112. The angle $\alpha$ of the trapezoid may be below 90° and above 15°, such as 75°, such as 65°, such as 60°, such as 50°, such as 45°, such as 30°. The length of the central foam region closer to the carrier, $L_c$, is shorter than the length of the central foam region abutting the wearer's head, $L_t$. In other words, the foam padding has a tapered hardness profile. The length of the central foam region abutting the wearer's head, $L_t$, may be between 30 and 80 mm and the length of the central foam region closer to the carrier, $L_c$, may be between 0 and 40 mm. Such formation of the soft foam allows the central padding portion 112 to bend inwardly due to contact with the user's head resulting in an enlarged touch area 300 which extends even beyond the central foam region and which is controlled by the increased hardness of the foam in the peripheral region thereby resulting in an improved pressure distribution along the top of the head without any prominent pain points.

In one embodiment, the central foam region 112 may comprise L3015 foam and the peripheral regions 114 may comprise ADAR foam. L3015 foam has a density of around 30 $kg/m^3$ and hardness in the range between 10 and 18 ASKER. ADAR foam has a density of around 22 $kg/m^3$ and hardness in the range between 48 and 52 ASKER.

Figure 4:
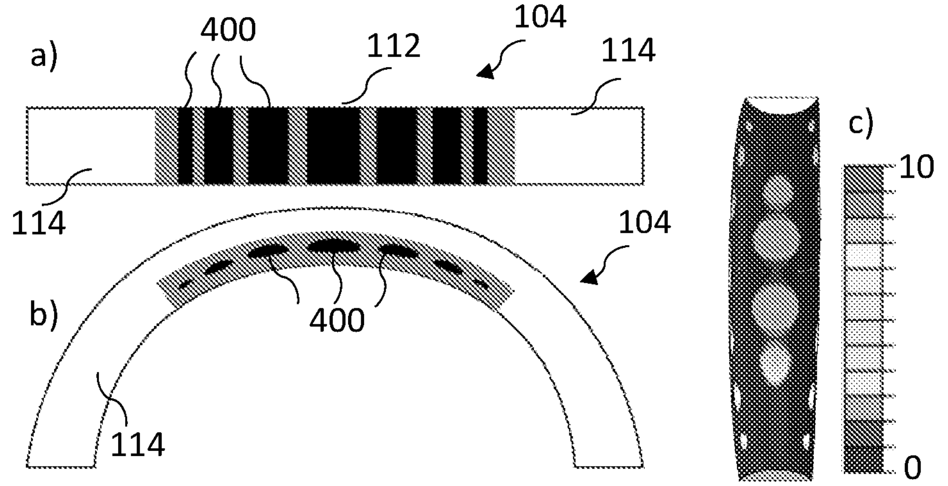

FIG. 4 schematically illustrates an exemplary embodiment of the foam padding 104 for the headband according to the present invention. In this embodiment, the foam padding 104 in the central foam region 112 comprises a plurality of holes 400 formed in the foam padding 104. The holes 400 may be created by removing a portion of the foam padding material. By removing the portion of the foam padding material, the density of the padding 104 is changed thereby resulting in decreased hardness of the central region 112. Lower hardness results in an improved pressure distribution at the touch area of the head compared to a number of other headbands in the art having a uniform hardness along the headband. In this embodiment, the holes 400 formed in the foam padding 104 are through-going holes. FIG. 4*a*) shows a first longitudinal section of the foam padding 104 where it can be seen that the holes 400 are created by removing a portion of the padding material to create an openings in the padding material 104. In other words, the holes 400 are extending all the way through the foam padding 104. The through-going hole may be formed perpendicularly to the carrier, or in parallel to the carrier, or diagonally through the padding material. In some embodiments, the holes 400 may be formed by combining any of the three mentioned formations. As it is illustrated in FIG. 4*b*) showing a second longitudinal section of the foam padding 104, the plurality of holes 400 are arranged such that a size of holes 400 gradually decreases from a midpoint of the central foam region 112 towards the peripheral foam regions 114. Alternatively, density of holes can be changed from the midpoint of the headband towards the peripheral foam region resulting in gradual increase in density and thus hardness of the padding. In yet one alternative, density of holes can be changed, namely, the holes may be differently spaced starting from the midpoint of the headband towards the peripheral foam region. FIG. 4*c*) illustrates simulation results for pressure distribution on the user's head for the headband comprising a foam padding of FIG. 4*a*). It can be seen from the graph and a corresponding scale, that there are no prominent pressure points with an increased pressure on the user's head.

Figure 5:
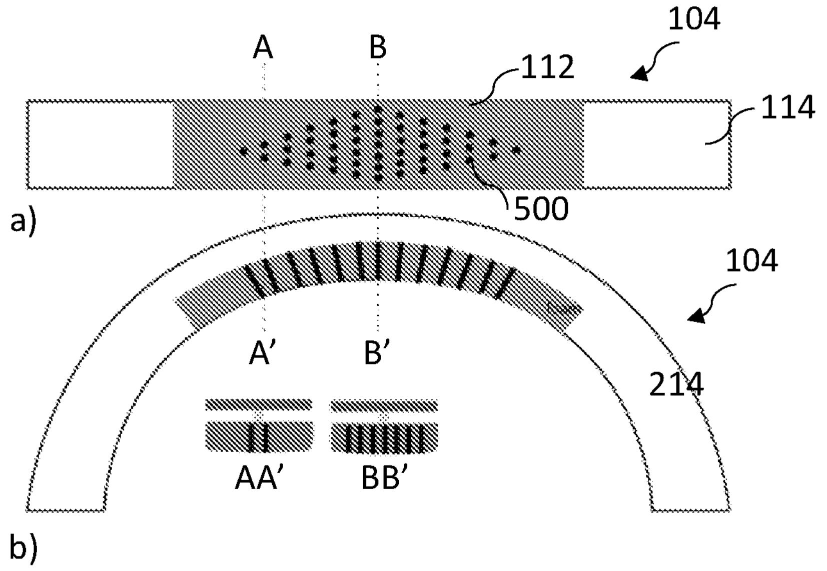

FIG. 5 illustrates yet one exemplary embodiment of the foam padding 104 for the headband according to the present invention. In this embodiment, the foam padding 104 in the central foam region 112 comprises a foam with a first hardness and a plurality of holes 500 formed therein. The holes 500 are through-going holes. FIG. 5*a*) shows a first longitudinal section of the foam padding 104 where it can be seen that the holes 500 are created by removing a portion of the padding material to create an openings in the padding material 104. As it is illustrated in FIG. 5*b*) showing a second longitudinal section and two cross-sections of the foam padding 104, the plurality of holes 500 are arranged in a substantially rhomboid-like arrangement. One diagonal along the BB' line coincides a midline of the headband crossing the midpoint of the headband. This diagonal comprises 7 holes. The number of holes then decreases further away from the diagonal BB'. Such formation results in the foam padding 104 which is the softest in along the midline and whose hardness increases gradually as the number of holes gradually decreases. Inserts AA' and BB' illustrate cross cuts along AA' and BB' lines.

Figure 6:
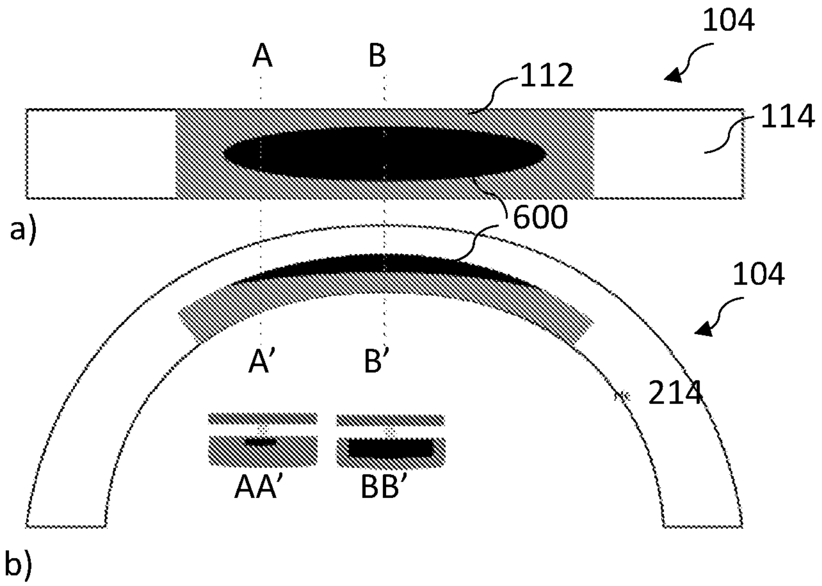

FIG. 6 illustrates yet one exemplary embodiment of the foam padding 104 for the headband according to the present invention. In this embodiment, the foam padding 104 in the central foam region 112 comprises a foam with a first hardness and a cut hole 600 formed therein. The foam padding 104 may comprise foam with a first hardness in the peripheral regions 114, or it may comprise foam with a second hardness in the peripheral regions 114. The hole 600 is formed by removing a portion of the foam with the first hardness. FIG. 6*a*) shows a first longitudinal section of the foam padding 104 where it can be seen that the hole 600 is created by removing a portion of the padding material to create the hole 600. The hole 600 has an ellipsoidal shape. FIG. 6*b*) shows a second longitudinal section of the foam padding 104 with the hole 600 formed in the central region 112. Inserts AA' and BB' illustrate cross cuts along AA' and BB' lines.

Figure 7:
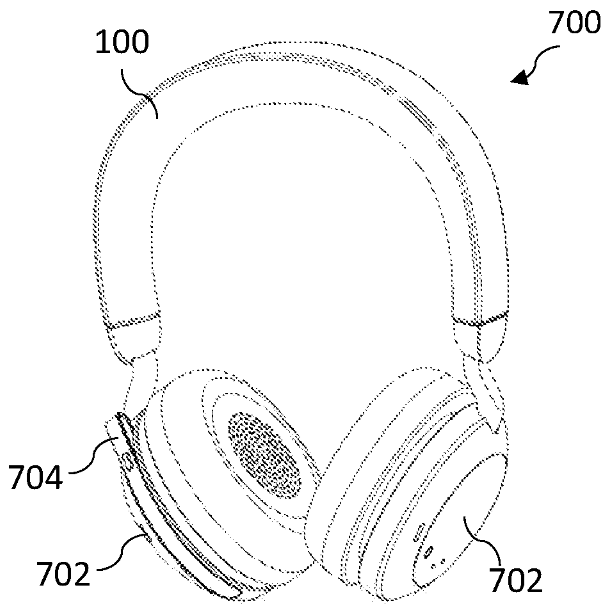

FIG. 7 schematically illustrates a headphone 700 according to a second aspect of the present invention. The headphone comprises the headband 100 according to any of the embodiments described in FIGS. 1-6. The headphone comprises two earcups 702. One of the earcups 702 comprises a microphone 704.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

100 headband
102 carrier
104 foam padding
106 first carrier end
108 second carrier end
110 central carrier region
112 central foam region
114 peripheral foam region
200 head
202 pressure distribution
300 touch area
400, 500 holes
600 cut hole
700 headphones
702 earcup
704 microphone

The invention claimed is:

1. A headband for a headset, the headband being configured to carry at least one earcup of the headset, the headband comprising:
 - a carrier being curved to conform to a wearer's head and having a first carrier end, a second carrier end and a central carrier region between and elevated relative to the first and second carrier ends;
 - a foam padding coupled to the carrier and configured to abut a wearer's head when the headband is worn by the wearer,
 - wherein the foam padding is configured to have a uniform shape, and
 - wherein the foam padding includes a central foam region arranged at the central carrier region and a peripheral foam region arranged outside of the central carrier region,
 - wherein the foam padding in the central foam region has a lower hardness than the foam padding in the peripheral foam region, and
 - wherein the length of the central foam region closer to the carrier is shorter than the length of the central foam region abutting the wearer's head when the headband is worn by the wearer, providing the foam padding with a tapered hardness profile.

2. The headband for a headset according to claim 1, wherein the foam padding hardness changes gradually from a midpoint of the central foam region towards the peripheral foam region.

3. The headband for a headset according to claim 1, wherein the foam padding comprises a first foam arranged in the central foam region and a second foam arranged in the peripheral foam region.

4. The headband for a headset according to claim 1, wherein a transition in the foam padding in the peripheral foam region to the foam padding in the central foam region is angled to provide the foam padding with the tapered hardness profile.

5. The headband for a headset according to claim 1, wherein a cross-section of the central foam region perpendicular to the length of the headband has a substantially trapezoid-like shape, in accordance with the tapered hardness profile of the foam padding.

6. The headband for a headset according to claim 1, wherein the foam padding in the central foam region comprises at least one hole formed in the foam padding.

7. The headband for a headset according to claim 6, wherein the at least one hole formed in the foam padding is a through-going hole.

8. The headband for a headset according to claim 6, wherein the at least one hole formed in the foam padding is a cut-out of the foam padding.

9. The headband for a headset according to claim 1, wherein the foam padding in the central foam region comprises a plurality of holes formed in the foam padding and wherein the plurality of holes are arranged such that a number of holes gradually decreases from a midpoint of the central foam region towards the peripheral foam region.

10. The headband for a headset according to claim 9, wherein a cross-section of the central foam region perpendicular to the length of the headband comprises the plurality of holes arranged in a substantially rhomboid-like arrangement.

11. The headband for a headset according to claim 1, wherein at least two holes have different sizes.

12. The headband for a headset according to claim 1, wherein the headband further comprises an electrical cable, the electrical cable being configured for electrically connecting the at least one earcup of the headset.

13. The headband for a headset according to claim 1, wherein the carrier and the foam padding contribute to a clamping force of the headband.

14. The headband for a headset according to claim 1, wherein the carrier is formed from a rigid material into a U-shape.

15. A headphone comprising a headband according to claim 1 and at least one earcup arranged at an end of the headband.

* * * * *